(12) United States Patent
Morita et al.

(10) Patent No.: US 7,858,983 B2
(45) Date of Patent: Dec. 28, 2010

(54) ELECTROCHROMIC DISPLAY WITH CURRENT DRIVE CIRCUIT

(76) Inventors: Satoshi Morita, 7-101, Tachikwa-cho, Tottori (JP) 680-8634; Takao Yamauchi, 7-101, Tachikwa-cho, Tottori (JP) 680-8634; Yutaka Sano, 7-101, Tachikwa-cho, Tottori (JP) 680-8634

( * ) Notice: Subject to any disclaimer, the term of this patent is extended or adjusted under 35 U.S.C. 154(b) by 229 days.

(21) Appl. No.: 11/344,798

(22) Filed: Jan. 31, 2006

(65) Prior Publication Data

US 2006/0169980 A1 Aug. 3, 2006
US 2008/0283834 A9 Nov. 20, 2008

Related U.S. Application Data

(63) Continuation of application No. PCT/JP2004/010474, filed on Jul. 23, 2004.

(30) Foreign Application Priority Data

Jul. 31, 2003 (JP) ............ JP2003-284038
Sep. 12, 2003 (JP) ............ JP2003-322086

(51) Int. Cl.
 *H01L 29/04* (2006.01)
(52) U.S. Cl. .......... 257/59; 257/252; 257/254; 257/257; 257/258; 257/E23.016; 257/E29.147; 257/E29.117; 257/E27.125; 257/E27.1; 257/E27.132
(58) Field of Classification Search ........... 257/59, 257/252, 254, 257–258, E23.016, E29.147, 257/E29.117, E27.125, E27.1, E27.132
See application file for complete search history.

(56) References Cited

U.S. PATENT DOCUMENTS

| | | | |
|---|---|---|---|
| 4,218,120 A | 8/1980 | Kawamura et al. | |
| 5,004,663 A | 4/1991 | Badesha et al. | |
| 5,444,330 A | 8/1995 | Leventis et al. | |
| 5,847,860 A | 12/1998 | Hougham et al. | |
| 6,242,779 B1 * | 6/2001 | Maekawa | 257/347 |
| 6,467,935 B1 | 10/2002 | Schwab | |
| 6,538,632 B1 * | 3/2003 | Yamazaki et al. | 345/98 |
| 6,906,842 B2 | 6/2005 | Agrawal et al. | |

(Continued)

FOREIGN PATENT DOCUMENTS

EP 0084604 8/1983

(Continued)

OTHER PUBLICATIONS

The International Search Report for PCT/JP2004/010630 mailed on Sep. 21, 2004.

(Continued)

*Primary Examiner*—Wael M Fahmy
*Assistant Examiner*—Marc Armand

(57) ABSTRACT

An electrochromic display is disclosed which comprises an array-side substrate (10) wherein a TFT (14) and a pixel electrode (15) connected with the TFT (14) are formed, a color filter-side substrate (50) wherein a counter electrode (53) is formed, and an electrolyte layer (80) injected between the array-side substrate (10) and the color filter-side substrate (50). In this electrochromic display, the TFT (14) is formed to have an area not less than 30% of the area of the pixel, thereby supplying a larger current. Consequently, oxidation-reduction reaction in the electrochromic phenomenon proceeds at a higher rate, thereby enabling a high-speed response.

14 Claims, 10 Drawing Sheets

U.S. PATENT DOCUMENTS

| | | | |
|---|---|---|---|
| 6,992,808 | B2 | 1/2006 | Shinozaki et al. |
| 7,312,914 | B2 | 12/2007 | Shinozaki et al. |
| 7,342,288 | B2 * | 3/2008 | Fujii et al. ............ 257/401 |
| 7,460,289 | B2 | 12/2008 | Pichot et al. |
| 7,489,431 | B2 | 2/2009 | Malmstrom et al. |
| 2002/0031876 | A1 * | 3/2002 | Hara et al. ............ 438/166 |
| 2002/0101413 | A1 | 8/2002 | Johnson et al. |
| 2002/0197460 | A1 | 12/2002 | Kaneko et al. |
| 2003/0170965 | A1 * | 9/2003 | Kondo ............ 438/455 |
| 2006/0028707 | A1 | 2/2006 | Shinozaki et al. |
| 2006/0066933 | A1 * | 3/2006 | Jagt et al. ............ 359/265 |
| 2006/0139725 | A1 | 6/2006 | Kai et al. |

FOREIGN PATENT DOCUMENTS

| | | |
|---|---|---|
| EP | 1347330 | 9/2003 |
| JP | 56-024384 | 3/1981 |
| JP | 58-129468 | 8/1983 |
| JP | 59-091423 | 5/1984 |
| JP | 59-091424 | 5/1984 |
| JP | 61-095321 | 5/1986 |
| JP | 62-027722 | 5/1987 |
| JP | 62-110928 | 5/1987 |
| JP | 02-135322 | 5/1990 |
| JP | 02-192766 | 7/1990 |
| JP | 2003-084686 A | 7/1990 |
| JP | 10-232413 | 9/1998 |
| JP | 2001-188263 | 7/2001 |
| JP | 2001-264823 | 9/2001 |
| JP | 2002-258327 | 9/2002 |
| JP | 2-192766 A | 3/2003 |
| JP | 2003-084686 | 3/2003 |
| JP | 2003-149688 | 5/2003 |
| JP | 2004-518159 | 6/2004 |
| WO | WO 02/52339 | 4/2002 |
| WO | WO 02/056106 A1 | 7/2002 |

OTHER PUBLICATIONS

Tthe International Search Report for PCT/JP2004/010638 mailed on Sep. 28, 2004.

The International Search Report for PCT/JP2004/010474 mailed on Dec. 14, 2004.

Office Action for U.S. Appl. No. 11/344,656 mailed Apr. 4, 2009.

Non-final Office Action on U.S. Appl. No. 11/344,656, mailed Sep. 18, 2009.

Office Action on U.S. Appl. No. 11/344,656, mailed Mar. 23, 2010.

Notice of Allowance for U.S. Appl. No. 11/344,656, mailed Jun. 2, 2010.

* cited by examiner

ELECTROCHROMIC DISPLAY WITH CURRENT DRIVE CIRCUIT

This application is a continuation of Application No. PCT/JP2004/010474, filed Jul. 23, 2004, which claims priority to both Japanese Application No. JP2003-284038, filed Jul. 31, 2003 and Japanese Application No. JP2003-322086, filed Sep. 12, 2003.

BACKGROUND

1. Field

The present invention relates to an electrochromic display that displays images by utilizing an electrochromic phenomenon.

2. Description of the Related Art

Electronic paper is getting more and more attention as a new display medium that combines the characteristics as paper, which is no need of information holding energy, can be securely saved, easily read, quickly readable and so on, and the characteristics as an electronic display capable of rewriting information and so on.

Various types are known as a display principle in the electronic paper. For example, it is a microcapsule type electrophoretic display method where capsules enclosing positively and negatively charged black and white particles are moved between electrodes. Further, it is a twist ball method where the direction of spherical particles colored in black and white are controlled. These methods perform display by utilizing a physical phenomenon.

On the other hand, there is known a method that performs display by utilizing a chemical phenomenon. Among others, one utilizing an electrochromic phenomenon is known where voltage is applied between electrodes to cause coloring or deletion by oxidation-reduction reaction. This is described in Japanese Patent Laid-Open No. 2002-258327 publication, for example.

A drive circuit same as a drive circuit in a liquid crystal display is used for driving each electrode of an electrochromic display as it is also shown in Japanese Patent Laid-Open No. 2002-258327 publication. This is a constitution where one TFT is used for each electrode, a gate electrode of the TFT is connected to a gate wire, a source electrode of the TFT is connected to a source wire, and a drain electrode of the TFT is connected to a pixel electrode, in which a charge quantity is controlled by source voltage. If the liquid crystal type drive circuit is directly used in the electrochromic display, a long time is required to accumulate necessary charge quantity in the pixel electrodes for oxidation-reduction reaction because the circuit depends on current capability of a source driver and TFT. Therefore, to increase response speed of display, it is necessary to proceed oxidation-reduction reaction in the electrochromic phenomenon in higher speed, and it is preferable that switching TFTs be capable of flowing as large current as possible when it is turned to ON state because charge quantity necessary for oxidation-reduction reaction can be supplied in a short time. Consequently, it is the first object of the present invention to provide an electrochromic display of high-speed response and high definition where TFTs are formed as large as possible to increase ON current.

Further, since the size of TFT that can be formed in one pixel is limited even if the size of TFT is made larger to increase the response speed of the electrochromic display, improving effect of response speed is limited only by making the size of TFT larger. In addition, use of high performance TFT drivers cause an increase of manufacturing cost. Thus, the second object of the present invention is to provide an electrochromic display of higher response speed and high definition where the constitution of a driver for TFTs is devised.

Furthermore, as the drive circuit for driving each pixel of the electrochromic display, a drive circuit generally used in an organic EL display could be used as shown in Japanese Patent Laid-Open No. 2002-108252 publication. Its constitution is that each pixel has: a TFT connected to a gate wire and a source wire; and a TFT made up of a gate electrode connected to the drain electrode of the foregoing TFT, a source electrode connected to a power supply wire, and a drain electrode connected to a pixel electrode. Since the organic EL type drive circuit has only one power supply wire, charge can be saved in the pixel electrode but it is difficult to reduce charge. In other words, a display state can be changed from white display to black display, but it is difficult to change the display state from black display to white display. This is because means for changing electric potential of the power supply wire or the like is necessary for the case of saving charge and reducing charge. Consequently, the third object of the present invention is to provide an electrochromic display of high-speed response and high definition where writing and deletion to pixels can be easily performed and rewrite time is shortened.

SUMMARY OF THE INVENTION

To solve the above-described problems, the electrochromic display of the present invention includes a plurality of pixels each of which is made up of a TFT, a pixel electrode, a counter electrode, an electrochromic layer and an electrolyte layer which are formed between the pixel electrode and the counter electrode, in which the size of the TFT is not less than 30% of the size of the pixel.

Further, the electrochromic display according to another aspect of the present invention includes a plurality of pixels each of which is made up of a TFT, a pixel electrode, a counter electrode, an electrochromic layer and an electrolyte layer which are formed between the pixel electrode and the counter electrode, in which one of a source electrode and a drain electrode of the TFT is formed in an approximately rod shape, and the other electrode is formed in a shape surrounding the one electrode. Further, the TFT has a source electrode having U-shaped concave portions and a drain electrode arranged between the U-shaped concave portions.

Furthermore, the electrochromic display according to another aspect of the present invention includes a plurality of pixels each of which is made up of a TFT, a pixel electrode, a counter electrode, an electrochromic layer and an electrolyte layer which are formed between the pixel electrode and the counter electrode, in which a current driving circuit is formed in each pixel. Further, the current driving circuit includes switching means and potential control means, and furthermore, the current driving circuit includes the switching means, the potential control means, rewrite specifying means and power blocking means.

Furthermore, the electrochromic display according to still another aspect of the present invention includes a plurality of pixels each of which is made up of a pixel electrode, a counter electrode, an electrochromic layer and an electrolyte layer which are formed between the pixel electrode and the counter electrode, in which the pixel is provided with independent deleting means and writing means.

Further, in the electrochromic display according to still another aspect of the present invention, the pixel includes two switching means and two rewriting means.

Still further, the electrochromic display according to another aspect of the present invention includes a plurality of pixels each of which is made up of a pixel electrode, a counter electrode, an electrochromic layer and an electrolyte layer which are formed between the pixel electrode and the counter electrode, in which the pixel is provided with independent two gate wires, two switching TFTs severally connected to the gate wires via a gate electrode, source wires connected to the source electrodes of the switching TFTs, two rewriting TFTs severally connected to the drain electrodes of the switching TFTs via a gate electrode, and two power supply wires severally connected to the source electrodes of the rewriting TFTs, and the drain electrodes of the rewriting TFTs are connected to the pixel electrode.

DETAILED DESCRIPTION OF THE PREFERRED EMBODIMENTS

In the following, description will be made for embodiments to implement the present invention based on the drawings. The embodiments show an electrochromic display of about 8 inches to 10 inches and having a pixel pitch of 80 to 100 μm.

Embodiment 1

Figure 1:
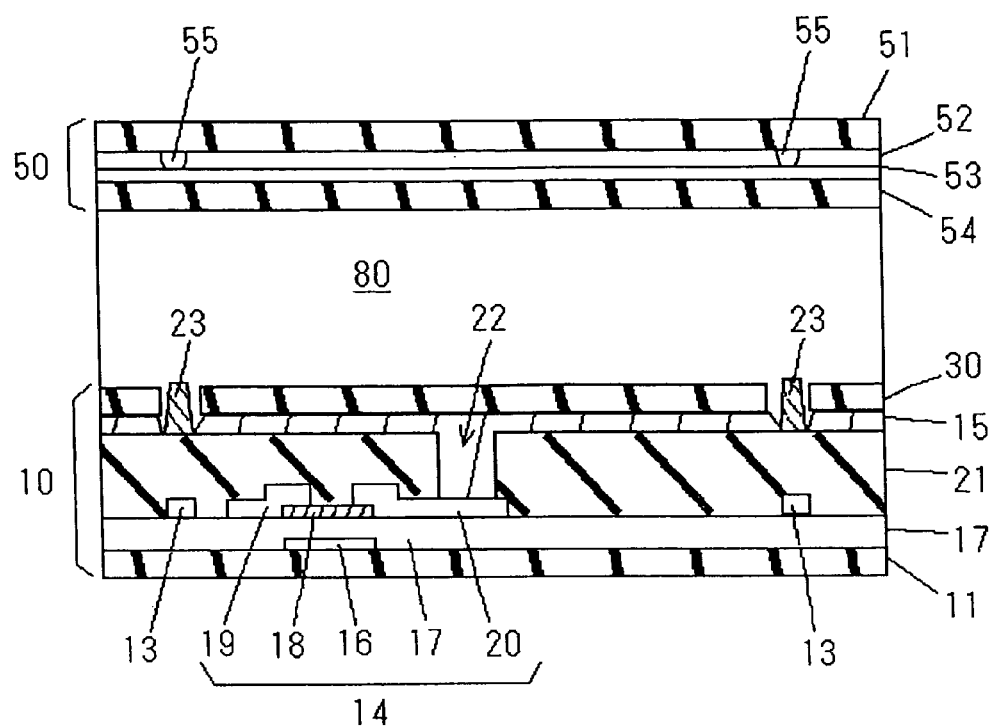
FIG. 1 shows a cross-sectional schematic view of a pixel of an electrochromic display of an embodiment of the present invention.
Figure 2:
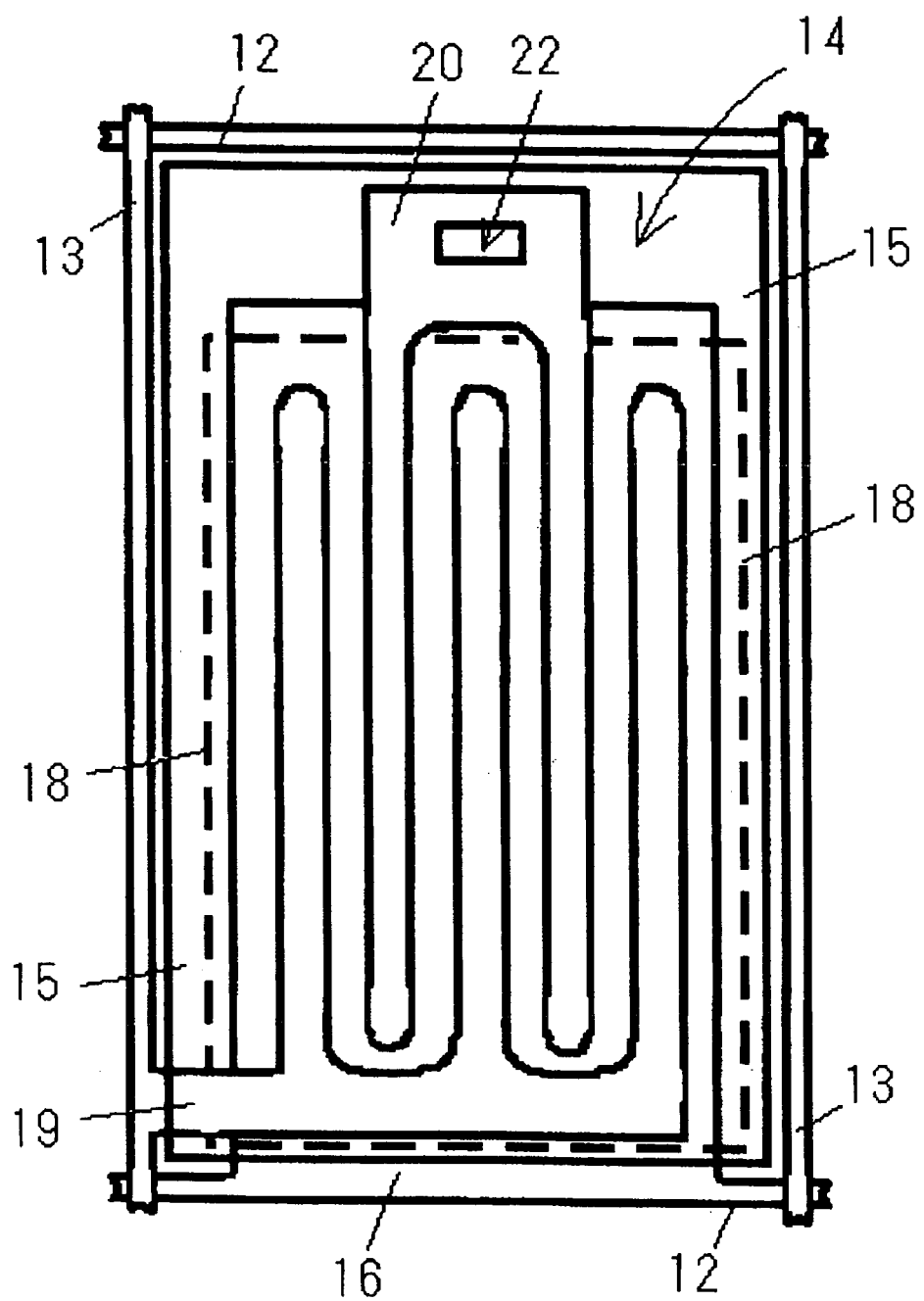
FIG. 2 shows a plan view of a pixel in an electrochromic display of an embodiment of the present invention.
Figure 3:
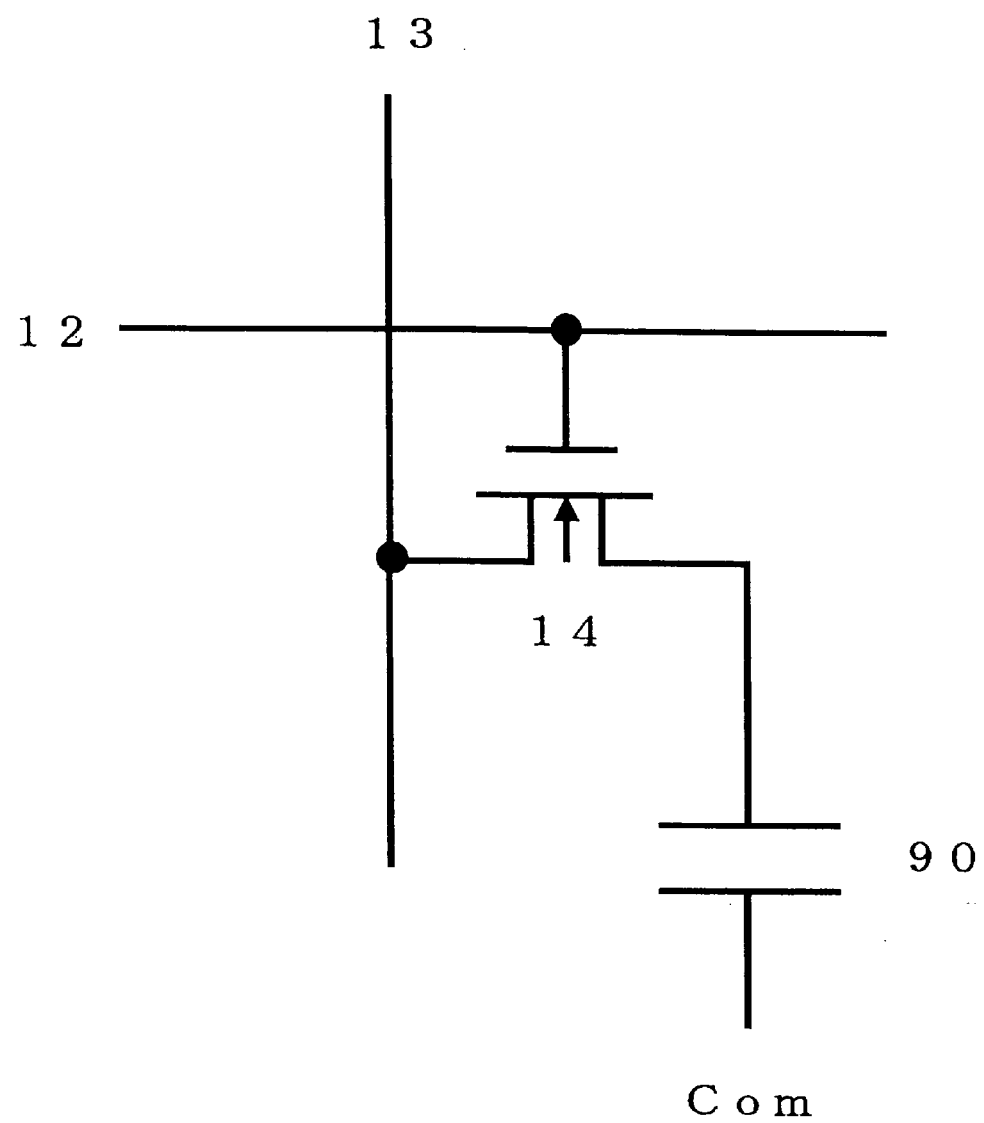
FIG. 3 shows a circuit diagram of a pixel in an electrochromic display of an embodiment of the present invention.

FIG. 1 shows the cross-sectional schematic view of a pixel in an electrochromic display of Embodiment 1, FIG. 2 shows the plan view of the pixel, and FIG. 3 is a view schematically showing the circuit diagram of the pixel. Note that FIG. 1 and FIG. 2 has different size, shape and the like of each constituent element.

The electrochromic display is constituted by an array-side substrate 10, a color filter-side substrate 50, and an electrolyte layer 80 sandwiched between the both substrates.

In the array-side substrate 10, a plurality of gate wires 12 and a plurality of source wires 13 are wired in a matrix state on a glass substrate 11. A region surrounded by the gate wires 12 and the source wires 13 corresponds to one pixel. A switching TFT 14, a pixel electrode 15 connected to the TFT 14, and an electrochromic layer 30 stacked on the pixel electrode 15 are formed on each pixel.

A plurality of the gate wires 12 are formed on the glass substrate 11 by stacking Al and Mo. Further, the gate electrode 16 of the TFT 14 is simultaneously formed when forming the gate wires 12. The gate electrode 16 has a size having about 65% of one pixel area, as shown in FIG. 2, and its shape is in an oblong rectangular shape approximately similar to the shape of the pixel. It is preferable that the switching TFT 14 be capable of flowing as large current as possible when it is turned to ON state for the purpose of performing oxidation-reduction reaction. Therefore, the gate electrode 16 is formed as large as possible.

A gate insulation film 17 made of $SiN_x$ is stacked on the glass substrate 11, and the gate insulation film 17 covers the gate wires 12 and the gate electrode 16. An amorphous silicon (hereinafter, referred to as a-Si) layer is stacked on the gate insulation film 17, and only a part of the layer that falls in the semiconductor layer 18 of the TFT 14 is left by a photolithography method (shown in a broken line in FIG. 2). At this point, the semiconductor layer 18 is in a shape covering a major part of the gate electrode 16.

A metal layer where Al and Mo are stacked is formed on the gate insulation film 17 and the semiconductor layer 18, the metal layer is patterned by the photolithography method to form the source wires 13, the source electrode 19 and the drain electrodes 20 of the TFT 14. At this point, the source wires 13 are provided orthogonal to the gate wires 12, and the source electrodes 19 are protruded from the source wires 13 at an area near the crossing portion with the gate wire 12.

The periphery of the source electrode 19 is in a shape taken along the periphery of the gate electrode 16 and also in a shape having U-shaped concave portions extending along the source wires 13, and it is in a shape having two concave portions in FIG. 2. The drain electrode 20 is in a shape having thin and long rod-shaped convex portions that are located between the U-shaped concave portions of the source electrode 13, and has two convex portions so as to correspond to the concave portions of the source electrode 19.

It is preferable that the switching TFT 14 be capable of flowing as large current as possible when it is turned to ON state for the purpose of performing oxidation-reduction reaction. Particularly, the TFT 14 using a-Si in the semiconductor layer 18 has difficulty of allowing current to flow therein comparing to a TFT using polysilicon despite advantages such as easiness of manufacturing comparing to the TFT using polysilicon, so it is necessary to make the TFT 14 as large as possible. Although a channel length may be shorter and a channel width may be wider in order to allow current to flow more smoothly, making the TFT 14 as large as possible to widen the channel width is more effective because there is a limitation on manufacturing engineering in shortening the channel length. The size of TFT may be no less than half the area of one pixel region, more preferably it may be no less than 60% of the area.

Consequently, in Embodiment 1, the shapes of the source electrode 19 and the drain electrode 20 are devised to allow current to flow as much as possible between source/drain when the TFT 14 becomes ON state. Specifically, the gate electrode 16 of the TFT 14 is formed in an oblong rectangular shape corresponding to the shape of the pixel to make the source electrode 19 and the drain electrode 20 long, and the channel width can be wider in a limited space. Further, by providing the U-shaped concave portions in the source electrode 19 and arranging the drain electrode 20 between the concave portions, the source electrode 19 is located on the both sides of the drain electrode 20 to make the channel width become twice, and thus the channel width can be made larger effectively in a small space.

An insulation film 21 is formed so as to cover the source wires 13 and the TFT 14. Meanwhile, although not shown, the insulation film 21 consists of two layers where a lower layer is formed of inorganic insulation film such as $SiN_x$ and an upper layer is formed of organic insulation film such as photosensitive acrylic resin. Then, countless concavity and convexity (not shown) are formed on the organic insulation film. The reason why the concavity and convexity are formed on the surface of the insulation film 21 is to form a pixel electrode reflection type electrochromic display that reflects outside light on the pixel electrode 15 by using a reflective electrode material made of metal for the material of the pixel electrode 15 (described later).

In the case of a general electrochromic display, coloring agent is contained in the electrolyte layer 80 in order to improve contrast. White particles for coloring are used in the coloring agent, and inorganic particles of calcium oxide, magnesium oxide, titanium dioxide or the like are specifically cited. In using such inorganic particles, they must be mixed into the electrolyte layer 80 at a fixed ratio. Further, in using such electrolyte layer 80, certain thickness of the electrolyte layer 80 is required because good contrast cannot be secured if the electrolyte layer 80 is made thin too much. Furthermore, when the electrolyte layer 80 is made thinner, there is a danger that short circuit will occur between the array-side substrate 10 and the color filter-side substrate 50 due to the inorganic particles.

However, since the pixel electrode reflection type electrochromic display does not have the danger of the above-described problem, a gap between the array-side substrate 10 and the color filter-side substrate 50 can be made narrower. In addition, the size and the application of the electrochromic display are often limited in a way to electronic books, advertisement on the street, or the like, and an observing position in such a case is also limited in a way. Therefore, it is better to enhance contrast in a specific direction rather than securing a wide view angle by using coloring agent or the like. Consequently, by using the pixel electrode reflection type electrochromic display in which the concavity and convexity are provided on a pixel electrode surface and a reflecting direction of light is focused in a fixed direction, contrast in an arbitrary direction can be enhanced. The tilt angle of the concavity and convexity formed on the pixel electrode surface is about 10° in order to focus light in a fixed direction.

In an area that does not overlap the semiconductor layer 18 of the drain electrode 20, a contact hole 22 is formed in the insulation film 21. Further, a reflective electrode material made of Al is stacked on the insulation film 21, the reflective electrode material is patterned by the photolithography method to form the pixel electrode 15. Ag or Al is specifically preferable for the reflective electrode material from the viewpoint of reflection efficiency, conductivity, or the like. The drain electrode 20 of the TFT 14 is connected to the pixel electrode 15 via the contact hole 22. The surface of the pixel electrode 15 becomes uneven due to the effect of the insulation film 21 located under the electrode. Further, the area of the pixel electrode 15 is slightly smaller than the area of one pixel, and a region that can be used for display and a region capable of reflecting light are made wider by increasing the area of the pixel electrode 15. The end portions of the pixel electrode 15 may be partially overlapped with the gate wire 12 or the source wire 13 when seen on a plan view as long as they do not contact an adjacent pixel electrode 15.

Short circuit prevention means for preventing adjacent pixel electrodes 15 and adjacent electrochromic layers 30 from short-circuiting with each other is provided around the pixel electrode 15. It is specifically a barrier 23 formed so as to surround the pixel electrode 15. The barrier 23 is formed of Novolac resin on the insulation film 21 on the gate wires 12 and the source wires 13. Its height is approximately the same as the thickness of the electrochromic layer 30, which is about 10 μm in this embodiment. When higher definition display needs to be performed, the size of one pixel becomes smaller, a gap between pixels becomes narrower, and there is a danger of causing short circuit of the pixel electrode 15 with adjacent pixels. Particularly, with advance of even higher definition in future, a distance between adjacent pixels, that is, the distance between the pixel electrode 15 and the pixel electrode 15 in this case becomes about 5 μm to 30 μm, and there is a higher chance of causing short circuit.

However, by providing the short circuit prevention means in this manner, short circuit among adjacent pixel electrodes 15 can be prevented, and the electrochromic layer 30 formed on the pixel electrode 15 is prevented from short-circuiting with an adjacent electrochromic layer 30. Note that the barrier 23 may be any type as long as it is an insulator, and it may be formed of organic resin or inorganic resin other than Novolac resin. Further, as the short circuit prevention means other than the barrier 23, a groove may be formed in the insulation film 21 at a boundary area to an adjacent pixel, for example.

The electrochromic layer 30 is formed in a region on the pixel electrode 15, which is surrounded by the barrier 23. As the electrochromic layer 30, one that is made of a material indicating coloring and erasing by electrochemical oxidation or reduction reaction and used in a general electrochromic display may be used. For example, tungsten oxide, titanium oxide, molybdenum oxide, iridium oxide, nickel oxide, vanadium oxide, tin nitride, indium nitride, polythiophene, polypyrrole, metal phthalocyanine, viologen and the like are cited. Alternatively, one having a nano-particle thin film state material as described in International Publication No. 97/35227 or the like may be used. By using a nano-particle thin film state material, oxidation-reduction reaction can be accelerated to increase display response speed or to improve contrast. The nano-particle thin film state material is used in this embodiment as well, and a nano-particle thin film made of $SnO_2$ to which Sb is doped is specifically used in this embodiment.

Although the electrochromic layer 30 may be directly formed on the pixel electrode 15 by a widely known method such as a vacuum evaporation method and a sputtering method, for example, nano particles made of $SnO_2$ to which Sb is doped are formed first on each pixel electrode 15 by a screen printing method in the forming method of the nano-particle thin film in this embodiment. Productivity can be improved by the screen printing method. Further, since the barrier 23 surrounding the periphery of the pixel electrode 15 is formed, it is possible to form the nano-particle thin film highly accurately on the pixel electrode 15 by utilizing the barrier 23. Particularly, when the forming method of the nano-particle thin film is done by the screen printing method, the height, area or the like of the nano-particle thin film can be formed very accurately in a space formed by the barrier 23 on the pixel electrode 15. Then, after performing a process such as sintering the nano-particle thin film and allowing the film to adsorb oxidized or reduced compound, the electrochromic layer 30 is formed.

In a color filter-side substrate 50, a color filter 52 provided corresponding to each pixel, a counter electrode 53, and an electrochromic layer 54 stacked on the counter electrode 53 are formed on a glass substrate 51.

Black matrix 55 is formed on the glass substrate 51 so as to sectionalize each pixel, and the color filter 52 corresponding to each pixel is formed at the opening of the black matrix 55. The color filter 52 consists of three colors of red (R), green (G) and blue (B), for example, and one color out of the three colors is arranged corresponding to each pixel. The counter electrode 53 made of ITO or IZO, for example, is stacked on the color filter 52.

The electrochromic layer 54 is formed on the counter electrode 53. The electrochromic layer 54 is formed by a layer formed of the nano-particle thin film similar to the array-side substrate 10. A nano-particle thin film made of $TiO_2$ is specifically used in this embodiment. After forming the nano-particle thin film on the counter electrode 53, the electrochromic layer 54 is formed after performing a process such as sintering the nano-particle thin film or allowing the film to adsorb oxidized or reduced compound. Then, the array-side substrate 10 and the color filter-side substrate 50 are arranged in a facing manner.

The electrolyte layer 80 serves a role to carry charge by ions contained in solvent. As the electrolyte layer 80, one used in a general electrochromic display may be used, and its constituent material and forming method are not particularly limited. It also may be a liquid electrolyte layer, a gel system electrolyte layer, or a solid system electrolyte layer.

Solvent into which electrolyte is dissolved can be used as the liquid electrolyte layer. As specific solvent, water, propylene carbonate, ethylene carbonate, y-butyrolactone and the like are cited. As specific electrolyte, sulfuric acid, hydrochloric acid and the like are cited as acids, and sodium hydroxide, potassium hydroxide, lithium hydroxide or the like is cited as alkalis. As salts, inorganic ion salt, quaternary ammonium salt, cyclic quaternary ammonium salt or the like of alkaline (earth) metal salt such as lithium perchlorate, sodium perchlorate and silver perchlorate is cited.

As the gel system electrolyte, one produced by mixing and polymerizing acetonitrile, ethylene carbonate, propylene carbonate or their mixture with polymer such as polyacrylonitrile and polyacrylamide is specifically cited.

As the solid system electrolyte, polymer side chain such as polyethyleneoxide having salt such as sulfone imide salt, alkylimidazolium salt and tetra-cyanoquinodimethane salt is cited.

When the electrolyte layer 80 is the liquid electrolyte layer, a sealing material is coated on the peripheral portion of the array-side substrate 10 or the color filter-side substrate 50. The sealing material is coated so as to form an injection port for injecting the material of the electrolyte layer 80. Then, the both substrates are bonded together, and the material of the electrolyte layer 80 is injected into a fixed gap generated between the both substrates via the injection port. Note that the sealing material is coated such that the fixed gap generated between the both substrates becomes the layer thickness of the electrolyte layer 80 (described later). Further, as an injection method of the material of the electrolyte layer 80, a widely known method such as a vacuum injection method may be used, for example.

The thickness of the electrolyte layer 80 is between about 5 μm and about 50 μm, and it is preferably between about 7 μm and about 30 μm. If the thickness of the electrolyte layer 80 becomes too thick, there is a danger that an observer will recognize even the display state of an adjacent pixel through one pixel when he/she observes the display state, so it is preferable that the thickness of the electrolyte layer 80 be as thin as possible. On the contrary, if the thickness of the electrolyte layer 80 becomes too thin, its role may become insufficient, the array-side substrate 10 may highly likely short-circuit with the color filter-side substrate 50 due to a foreign object, or a problem on manufacturing engineering is considered, so that the above-described layer thickness is appropriate.

Although not shown in this embodiment, spherical spacers are sprayed on the array-side substrate 10. Thus, the thickness of the electrolyte layer 80 can be maintained at a fixed thickness over the entire electrochromic display, stable display can be performed, and the spraying can be performed easier than forming columnar spacers on the array-side substrate 10. Regarding the number of the spherical spacers, it is not necessary to allow spacers to exist in several numbers per one pixel like spherical spacers for strictly controlling a cell gap in a liquid crystal display, for example, but they may be sprayed in one spacer per a plurality of pixels. Therefore, the spherical spacers rarely affect display.

In the electrochromic display, a gate wire drive circuit and a source wire drive circuit (both are not shown) for selecting each pixel are respectively provided at the end portion side of the gate wire 12 and the end portion side of the source wire 13, and a signal control section (not shown) for controlling the gate wire drive circuit and the source wire drive circuit is provided. The gate wire drive circuit controlled by the signal control section applies a gate signal to a predetermined gate wire 12. The gate signal is applied to the gate electrode 16 of the switching TFT 14 to turn the TFT 14 to ON state. The source signal applied to a predetermined source wire 13 is applied from the source electrode 19 of the TFT 14 to the pixel electrode 15 via the drain electrode 20, and display is performed by a display element 90.

Embodiment 2

FIG. 4, FIG. 5, FIG. 6, FIG. 7 and FIG. 8 schematically show circuit diagrams of the electrochromic display of Embodiment 2. Note that the same reference numerals are applied to the same parts as those of FIG. 3.

Figure 4:
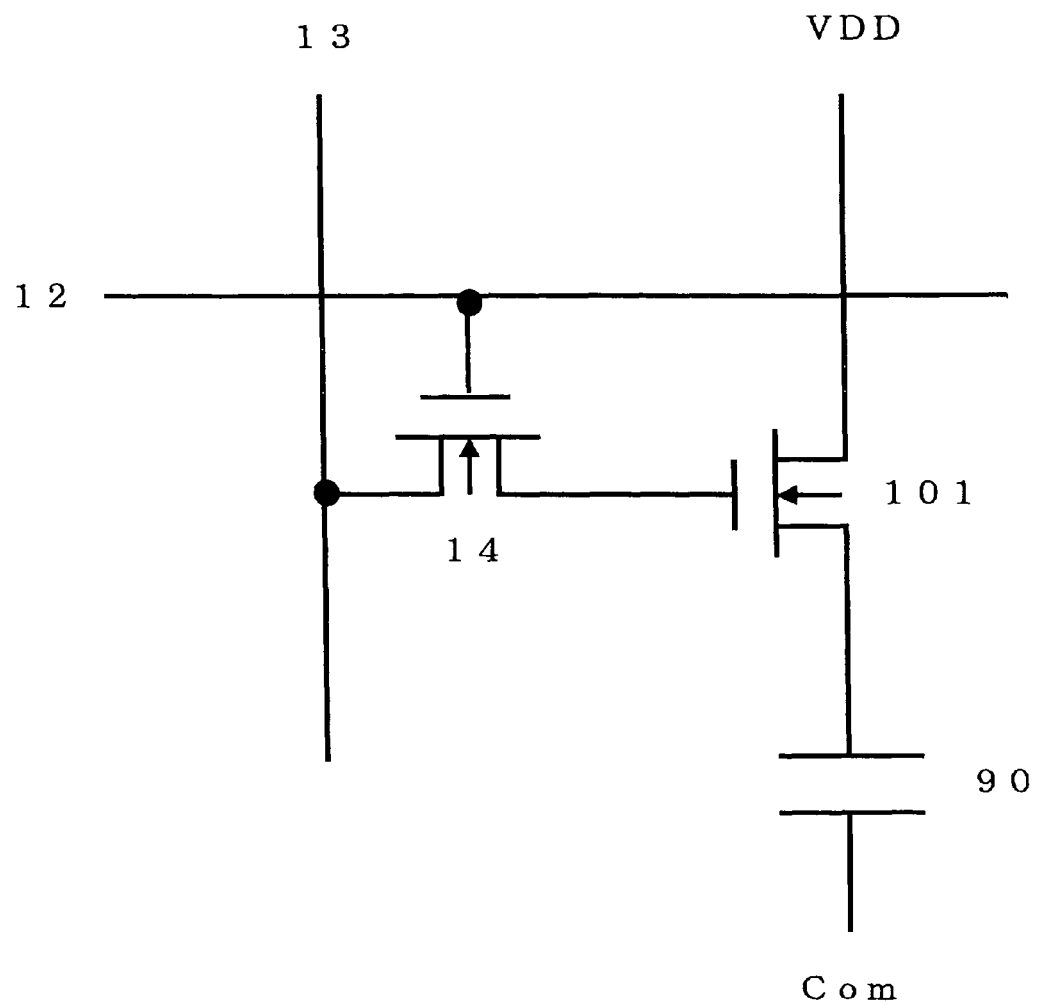
FIG. 4 shows a circuit diagram of a pixel in another embodiment.

FIG. 4, unlike FIG. 3 where display is performed by a voltage drive circuit, is a display performing display by a current drive circuit. In addition to the switching TFT 14, a power supply wire (Vdd) formed along the source wire 13 and a TFT 101 for supplying current to the display element 90 from the power supply wire (Vdd) are formed in each pixel. The gate electrode, the source electrode and the drain electrode of the TFT 101 are respectively connected to the drain electrode 20 of the TFT 14, the power supply wire (Vdd) and the display element 90.

Such current drive circuit can supply larger current to the display element 90 than the one in FIG. 3, and oxidation-reduction reaction can be proceeded at higher speed. In the case of this embodiment, power supply sorted in two types such as 10V for black display and 0V for white display should be performed to the power supply wire (Vdd). Further, a frame rate gradation method is suitable when performing gradation display.

Meanwhile, both the TFT 14 and the TFT 101 are formed of an N-type TFT, that is, a TFT using electrons as carriers, so that a-Si can be used for the semiconductor layer, and they can be formed in the same process. Further, it is not necessary to form the power supply wire (Vdd) along the source wire 13, but may be formed along the gate wire 12, and the power supply wire may be formed in any direction as long as it can supply power to each pixel.

Figure 5:
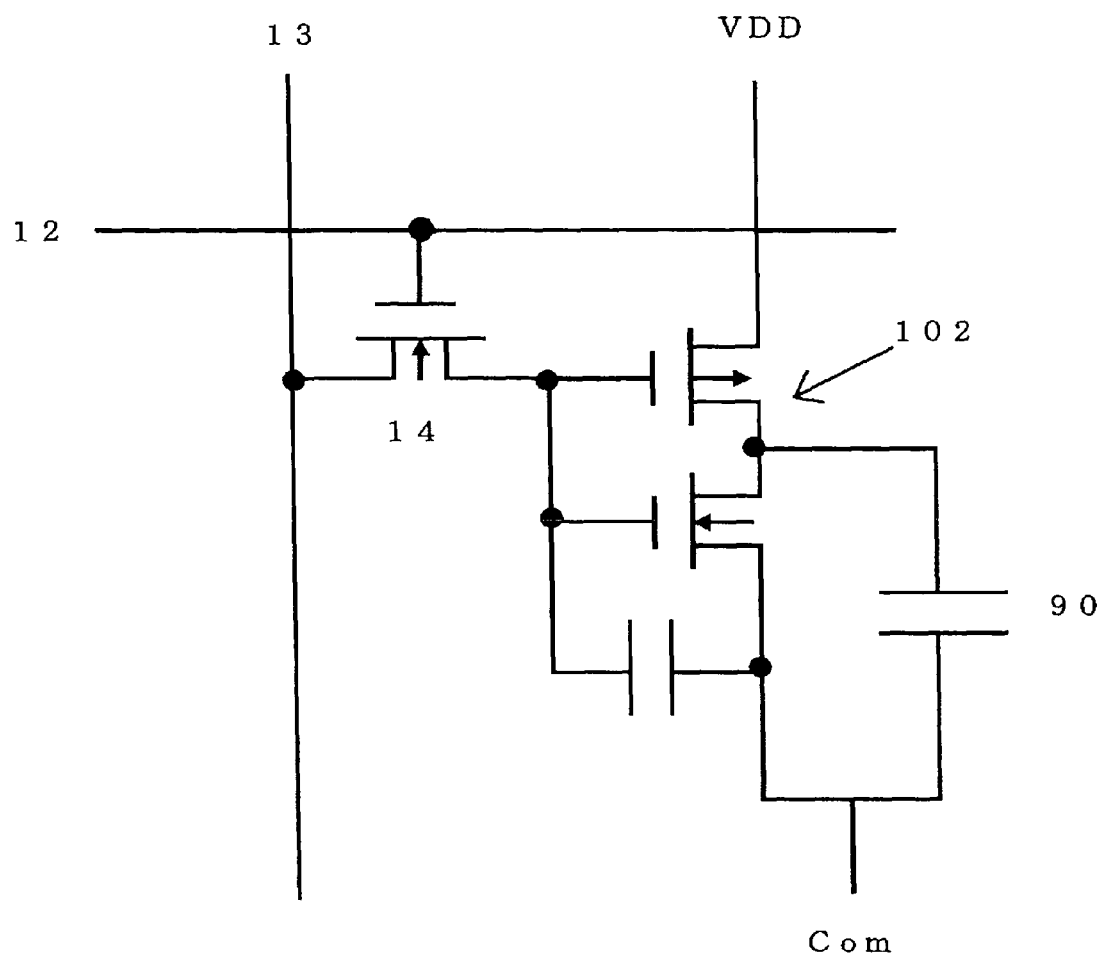
FIG. 5 shows a circuit diagram of a pixel in another embodiment.

FIG. 5 shows the current drive circuit as shown in the above-described embodiment, where switching means and potential control means are provided for each pixel. Specifically, an N-type switching TFT 14 is used as the switching means and CMOS 102 made up of a P-type TFT and an N-type TFT is used as the potential control means. The input terminal of the CMOS 102 is connected to the drain electrode 20 of the TFT 14, and the output terminal of the CMOS 102 is connected to the display element 90. With this, oxidation-reduction reaction can be proceeded at higher speed, and gradation display by a voltage gradation method also can be performed by the potential control means. Meanwhile, since the CMOS 102 is used in this embodiment, polysilicon will be used in the semiconductor layer of the TFT. Accordingly, it exerts effects such that power consumption is reduced and peripheral drive circuits can be formed integrally. Furthermore, the semiconductor layer 18 of the switching TFT 14 can be formed by polysilicon as well.

Figure 6:
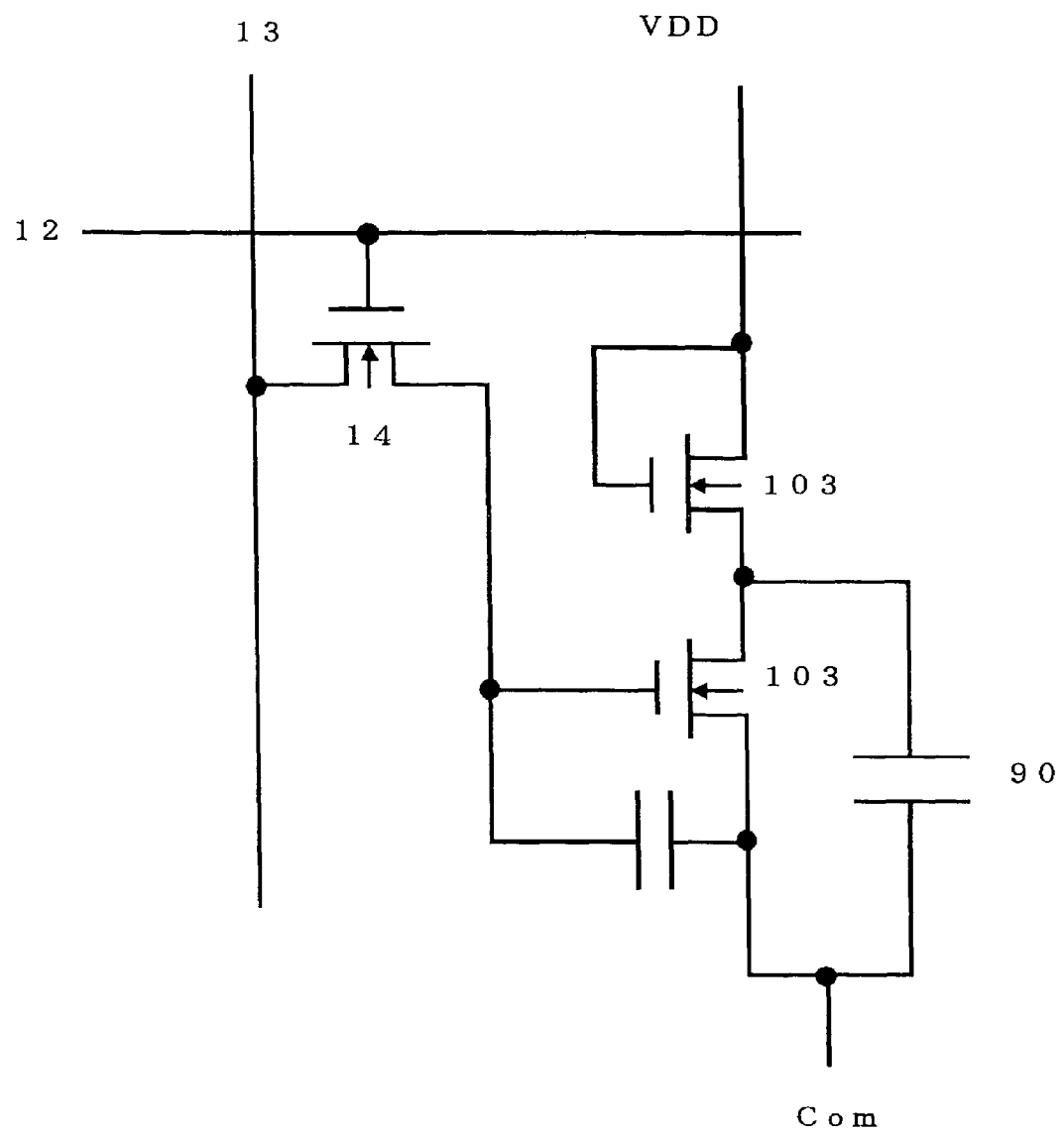
FIG. 6 shows a circuit diagram of a pixel in another embodiment.

FIG. 6 shows the circuit where the switching means and the potential control means are provided in each pixel in the same manner as FIG. 5. What is different from FIG. 5 is that it uses two of P-type or N-type TFTs 103 as the potential control means instead of the CMOS 102 (the figure shows N-type TFT). Therefore, the semiconductor layer of the TFTs can be manufactured by using a-Si without using polysilicon, and thus an effect such as easiness of manufacturing is exerted. Since all the TFTs formed for each pixel are N-type TFTs, a-Si may be used in their semiconductor layers, so that the increase of manufacturing processes can be suppressed comparing to the case where P-type and N-type TFTs are mixed in each pixel.

Figure 7:
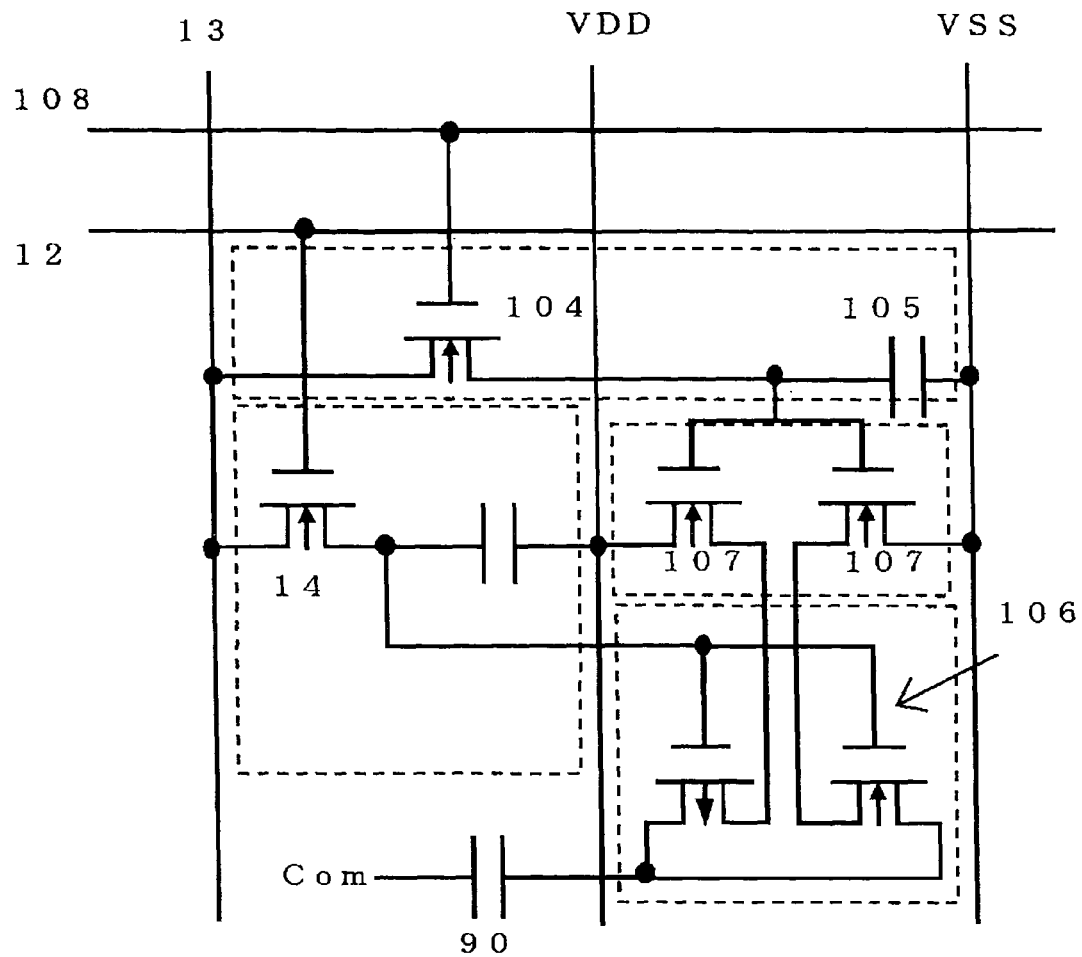
FIG. 7 shows a circuit diagram of a pixel in another embodiment.

FIG. 7 shows a circuit where switching means, rewrite specifying means, potential control means and power blocking means are provided for the current drive circuit of the above-described embodiment. Specifically, the switching TFT 14 is used as the switching means, an N-type TFT 104 and a capacitor 105 are used as the rewrite specifying means, CMOS 106 is used as the potential control means, and two N-type TFTs 107 are used as the power blocking means. The gate electrode of the TFT 104 is connected to a word wire 108 traveling parallelly with the gate wire 12, the source electrode of the TFT 104 is connected to the source wire 13, and the drain electrode of the TFT 104 is connected to the capacitor 105 and gate electrodes of the TFTs 107. The source electrodes of the TFTs 107 are severally connected to either one of the two power supply wires (Vdd)(Vss). The drain electrodes of the TFTs 107 are severally connected to either one of the P-type TFT and N-type TFT which constitute the CMOS 106, the input terminal of the CMOS 106 is connected to the drain electrode 20 of the TFT 14, and the output terminal of the CMOS 106 is connected to the display element 90. Consequently, in each pixel selected by the word wire 108 and the source wire 13, whether or not rewrite is necessary is specified, power is supplied to a pixel specified as one that needs to be rewritten, and power is not supplied to a pixel specified as one that does not need to be rewritten.

Since the electrochromic display has a so-called memory capability of display, if the display of corresponding pixels is the same as the one in the previous pixel selection, power consumption is reduced when such display is maintained as it is. Consequently, by providing the rewrite specifying means and the power blocking means for each pixel, the rewrite specifying means specifies that no rewrite is needed and the power blocking means blocks supply of power if there is no change between the display state in the previous selection and the display state of the current selection. The rewrite specifying means specifies that rewrite is needed and the power blocking means does not block supply of power if there is a change between the display state in the previous selection and the display state of the current selection. With this method, power consumption in the electrochromic display can be reduced. Note that polysilicon will be used in the semiconductor layers of the TFTs because the CMOS 106 is also used in this embodiment.

Figure 8:
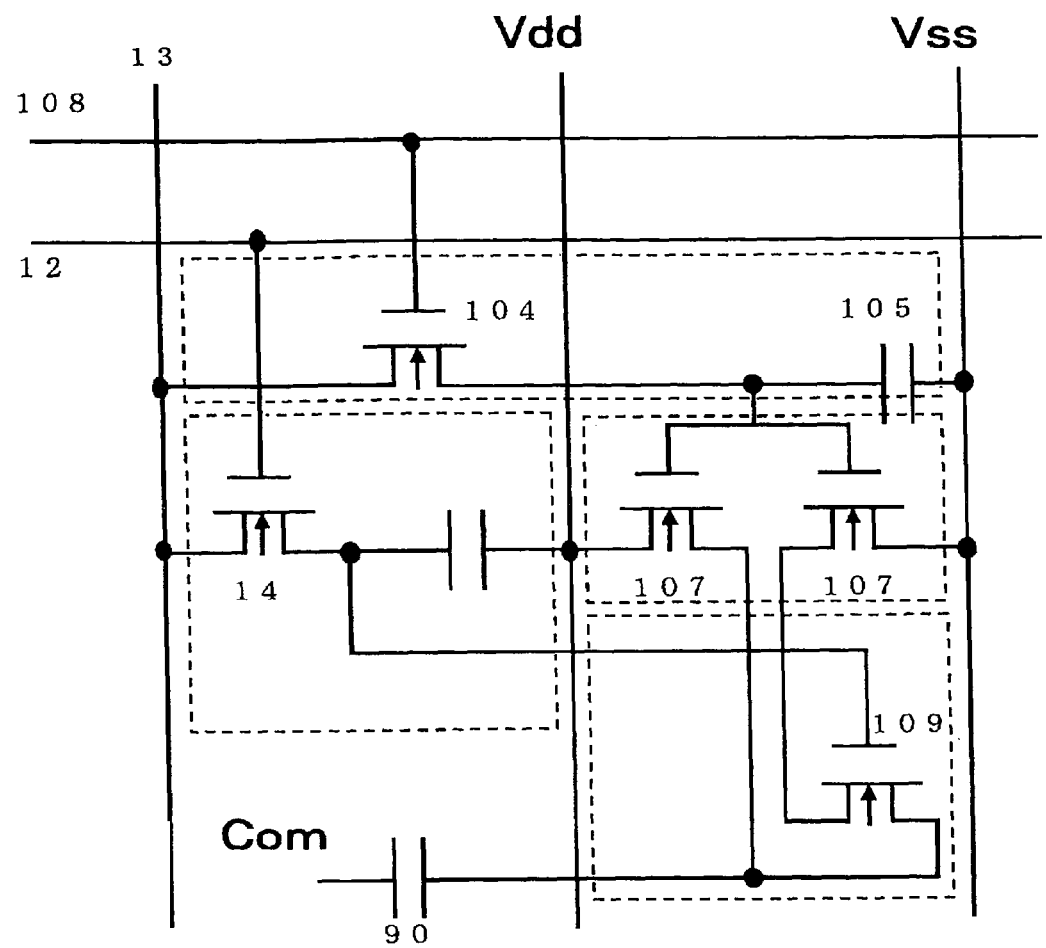
FIG. 8 shows a circuit diagram of a pixel in another embodiment.

FIG. 8 shows a current drive circuit where the switching means, the rewrite specifying means, the potential control means and the power blocking means are provided in each pixel similar to FIG. 7. What is different from FIG. 7 is that a P-type or an N-type TFT 109 is used as the potential control means instead of the CMOS 106 (the figure shows N-type). Therefore, the semiconductor layer of the TFTs can be manufactured by using a-Si without using polysilicon, and thus an effect such as easiness of manufacturing is exerted. Since all the TFTs formed for each pixel are N-type TFTs, a-Si may be used in their semiconductor layers, so that the increase of manufacturing processes can be suppressed comparing to the case where P-type and N-type TFTs are mixed in each pixel.

Meanwhile, the power supply wires (Vdd)(Vss) are shown in the circuit diagrams shown in FIG. 4 to FIG. 8, and the end portions of the power supply wires are connected to the power source. In this case, there is a danger that power supply capability will reduce as they become further from the power source due to wiring resistance. Therefore, the both ends of the power supply wire may be connected to the power source or adjacent power supply wires are connected to each other via one or more connection points to prevent the power supply capability from being reduced. In such a case, when the connection points are formed in a ladder shape, power can be supplied even if one wire out of the power supply wires is broken.

Embodiment 3

Figure 9:
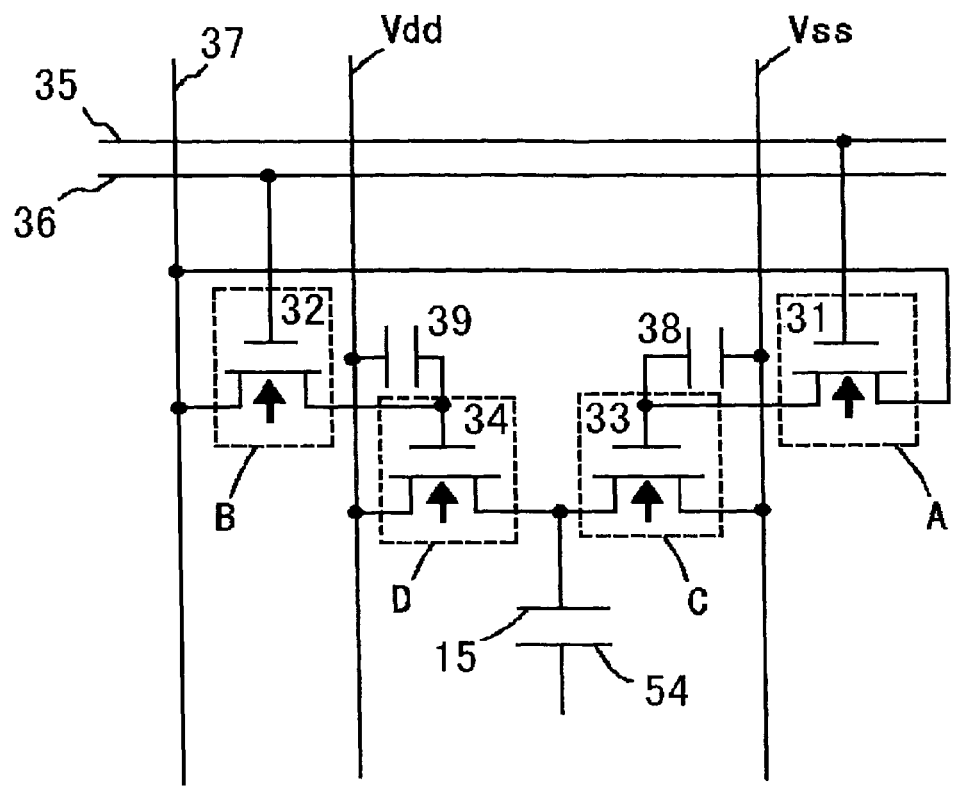
FIG. 9 is a circuit diagram of each pixel of the present invention.

Next, description will be made for a circuit constitution by which current is supplied to the pixel electrodes 15 that are used in the electrochromic display of Embodiment 3. FIG. 9 is the circuit diagram schematically showing the drive circuit provided for each pixel. Each pixel is provided with two switching means and two rewriting means for supplying or stopping current to the pixel electrodes 15.

Specifically, an N-type TFT 31 as switching means A and an N-type TFT 32 as switching means B are used. Then, an N-type TFT 33 as rewriting means C and an N-type TFT 34 as rewriting means D are used. Two independent gate wires 35, 36 are severally connected to each pixel, the gate electrode of the switching TFT 31 is connected to the gate wire 35, and the gate electrode of the TFT 32 is connected to the gate wire 36. Further, a source wire 37 is connected to each pixel, and the source electrode of the TFT 31 and the source electrode of the TFT 32 are connected to the source wire 37.

Then, the drain electrode of the TFT 31 and the gate electrode of the rewriting TFT 33 are connected to each other and the drain electrode of the TFT 32 and the gate electrode of the rewriting TFT 34 are connected to each other. Two independent power supply wires Vss, Vdd are connected to each pixel, the source electrode of the TFT 33 is connected to the power supply wire Vss, and the source electrode of the TFT 34 is connected to the power supply wire Vdd. Further, the drain electrode of the TFT 33 and the drain electrode of the TFT 34 are connected to the pixel electrode 15.

When scanning signals are sequentially supplied to the gate wire and the gate wire 35 is scanned, the TFT 31 becomes ON state. Then, the state of the TFT 33 is changed by data signals supplied from the source wire 37, and current from the power supply wire Vss is controlled. Furthermore, the TFT 32 becomes ON state when the gate wire 36 is scanned, the state of the TFT 34 is changed by data signals supplied from the source wire 37, and current from the power supply wire Vdd is controlled. Note that a storage capacitor 38 is formed between the power supply wire Vss and the gate electrode side of the TFT 33, and a storage capacitor 39 is formed between the power supply wire Vdd and the gate electrode side of the TFT 34, and the circuit is constituted to be capable of holding charge for a certain period even after scanning the gate wire.

At this point, when +5V is supplied to the power supply wire Vss and +8V is supplied to the power supply wire Vdd, for example, the display state in the electrochromic display becomes a deleted state, that is, changing from black display to white display due to power supply from the power supply wire Vss. On the contrary, power supply from the power supply wire Vdd causes the display state to become a writing state, that is, changing from white state to black state. As described, each pixel is severally provided with independent deleting means and writing means.

Next, description will be made with reference to the timing chart shown in FIG. 10. In this embodiment, the number of gradations is set to four gradations, complete writing (deletion) is not performed in only one frame, but maximum three frames are used as a writing (deletion) enable period to perform complete writing (deletion).

(a) shows a case where the display state is changed from black display to white display using the deleting means. First, when the gate wire 35 is scanned in the first frame, a signal for supplying enough quantity of current for turning black to gray, which is lightened from black by 33%, is allowed to flow from the source wire 37 to the pixel electrodes 15, the signal controls the TFT 33 to adjust the current from the power supply wire Vss, and the display state of the pixels is changed from black display to gray display (gray that has been lightened from black by 33%). When the gate wire 36 is scanned in the first frame, the source wire 37 does not supply a signal for starting writing. When the gate wire 35 is scanned in the second frame, the foregoing signal for supplying enough quantity of current for turning black to gray, which is lightened from black by 33%, is allowed to flow from the source wire 37 to the pixel electrodes 15, the signal controls the TFT 33 to adjust the current from the power supply wire Vss, and the display state of the pixels is changed to gray display that has been lightened from the gray display of the first frame by 33% (gray that has been lightened from black by 66%). When the gate wire 36 is scanned at this point, the source wire 37 still does not supply a signal for starting writing. By doing this, the display state is changed from black display to white display in the third frame. Note that it is not necessary that display is controlled to be lightened at an equal gap like 33%.

(b) shows a case of performing gray display where display is lightened from black by 66% using the deleting means. In this case, an object gray display state is realized by performing the same control as the first and second frames in the case of (a).

(c) shows a case where the display state is changed from white display to black display using the writing means. First, when the gate wire 35 is scanned in the first frame, a signal for performing deletion is not supplied from the source wire 37. Then, when the gate wire 36 is scanned, a signal for supplying enough quantity of current for turning white to gray, which is darkened from white by 33%, is allowed to flow from the source wire 37 to the pixel electrodes 15, the signal controls the TFT 34 to adjust the current from the power supply wire Vdd, and the display state of the pixels is changed from white display to gray display (gray that has been darkened from white by 33%). When the gate wire 35 is scanned in the second frame as well, the source wire 37 does not supply a signal for starting writing. When the gate wire 36 is scanned, the signal for supplying enough quantity of current for turning the display to gray, which is darkened from the foregoing gray by 33%, is allowed to flow from the source wire 37 to the pixel electrodes 15, the signal controls the TFT 34 to adjust the current from the power supply wire Vdd, and the display state of the pixels is changed to gray display, which has been darkened from the gray display of the first frame by 33%, (gray that has been darkened from white by 66%). By doing this, the display state is changed from white display to black display in the third frame.

(d) shows a case of performing the gray display that has been darkened by 66% from white display using the writing means. In this case, an object gray display state is realized by performing the same control as the first and second frames in the case of (c).

Figure 10:
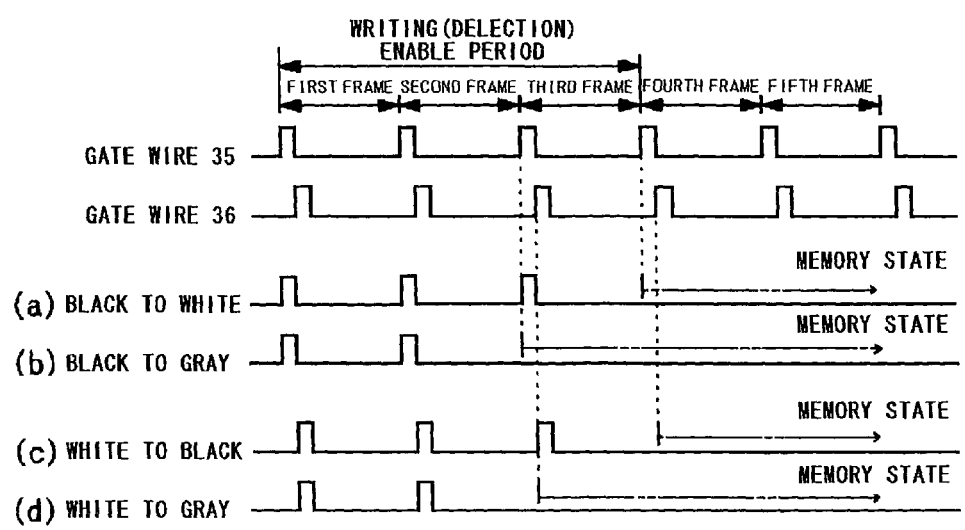
FIG. 10 is a timing chart of an embodiment of the present invention.

Since the electrochromic display has a so-called memory capability of display, if the display of corresponding pixels is the same as the one in the previous pixel selection, power consumption is reduced when such display is maintained as it is (this is shown as a memory state in FIG. 10). So, in the case of (a), since white display is continued in the fourth and further frames, the source wire 37 does not supply a signal for changing the display state when the gate wires 35, 36 are scanned. Such signal supply from the source wire 37 can be realized by performing comparison with a previous frame by using a frame memory installed in the display, and by performing signal generation processing based on its comparison result, for example.

Meanwhile, although complete writing (deletion) is performed by using three frames in this embodiment, the writing (deletion) may be completed only by one frame. However, in this case it is necessary to simultaneously scan the gate wires 35, 36 to supply current corresponding to writing (deletion) to the pixel electrode 15 and power consumption also becomes large, so it is preferable to divide writing (deletion) into several frames to drive either the deleting means or the writing means as shown in this embodiment.

Note that other modes than the above-described embodiments within the range of the gist of the present invention can be realized. For example, other insulative substrates such as a plastic substrate may be used other than the glass substrate 11. Furthermore, the insulative substrate may be film state having flexibility.

According to the electrochromic display of the present invention, a large TFT is formed and a wide channel width can be secured in one pixel, and thus it is possible to allow very large current to flow. Further, the current drive circuit is formed in each pixel and larger current can be allowed to flow. Therefore, oxidation-reduction reaction in the electrochromic phenomenon can be proceeded at a higher rate, and an electrochromic display capable of high-speed response can be provided.

Further, according to the electrochromic display of another aspect of the present invention, the deleting means and the writing means are independently provided for each pixel, and thus writing and deleting can be performed independently. Further, the means severally include the power supply wire, so that charge can be supplied to the pixel electrode in a short time and thus an electrochromic display capable of high-speed response can be provided.

Furthermore, according to the electrochromic display of still another aspect of the present invention, each pixel includes two rewriting means, writing and deleting can be performed independently, so that charge can be supplied to the pixel electrode in a short time and thus an electrochromic display capable of high-speed response can be provided.

It is claimed:

1. An electrochromic display, comprising:
 a plurality of pixels, wherein each pixel includes:
  a pixel electrode;

a counter electrode;

an electrochromic layer disposed between the pixel electrode and the counter electrode;

an electrolyte layer disposed between the pixel electrode and the counter electrode; and a current-driving circuit, comprising:
- a switch;
- a potential controller;
- a rewrite-specifying structure; and
- a power-blocking structure including two transistors, wherein each of the two transistors is coupled to the rewrite-specifying structure.

2. The electrochromic display of claim 1, wherein the current-driving circuit further comprises a power supply wire.

3. The electrochromic display of claim 1, wherein the rewrite-specifying structure comprises a thin film transistor (TFT) and a capacitor distinct from the switch.

4. The electrochromic display of claim 1, wherein at least one of the switch, the potential controller, the rewrite-specifying structure, or the power-blocking structure comprises an N-type thin film transistor (TFT).

5. The electrochromic display of claim 1, wherein the potential controller is formed from a complementary metal-oxide semiconductor (CMOS).

6. The electrochromic display of claim 1, further comprising two power supply wires connected to the two transistors in the power-blocking structure.

7. The electrochromic display of claim 1, wherein the switch, the potential controller, the rewrite-specifying structure, and the power-blocking structure each include at least one thin film transistor (TFT), and wherein all TFTs in the switch, the potential controller, the rewrite-specifying structure, and the power-blocking structure are N-type TFTs.

8. The electrochromic display of claim 1, wherein the switch, the potential controller, the rewrite-specifying structure, and the power-blocking structure each include at least one thin film transistor (TFT), and wherein all TFTs in the switch, the potential controller, the rewrite-specifying structure, and the power-blocking structure are P-type TFTs.

9. The electrochromic display of claim 1, wherein the potential controller is coupled to the power-blocking structure.

10. The electrochromic display of claim 1, wherein the switch is coupled to a source wire, a gate wire, and the potential controller.

11. The electrochromic display of claim 2, wherein the power supply wire is formed in a ladder shape.

12. The electrochromic display of claim 2, wherein the power-blocking structure is coupled to the power supply wire and a second power supply wire.

13. An electrochromic display comprising:

a plurality of pixels, wherein each pixel in the plurality of pixels has a total area and includes:
- a pixel electrode;
- a counter electrode;
- an electrochromic layer disposed between the pixel electrode and the counter electrode;
- an electrolyte layer disposed between the pixel electrode and the counter electrode;
- a thin film transistor (TFT) having an area which is not less than 30% of the total area of the pixel; and
- a current-driving circuit including at least a rewrite-specifying structure and a power-blocking structure including two transistors, wherein each of the two transistors is coupled to the rewrite-specifying structure.

14. An electrochromic display, comprising:

a plurality of pixels, wherein each pixel in the plurality of pixels has a total area and includes:

a pixel electrode;

a counter electrode;

an electrochromic layer disposed between the pixel electrode and the counter electrode;

an electrolyte layer disposed between the pixel electrode and the counter electrode;

a thin film transistor (TFT) having a gate electrode with an area that is about 65% of the total area of the pixel; and a current-driving circuit including at least a rewrite-specifying structure and a power-blocking structure including two transistors, wherein each of the two transistors is coupled to the rewrite-specifying structure.

* * * * *

UNITED STATES PATENT AND TRADEMARK OFFICE
CERTIFICATE OF CORRECTION

PATENT NO.         : 7,858,983 B2                                    Page 1 of 1
APPLICATION NO.    : 11/344798
DATED              : December 28, 2010
INVENTOR(S)        : Morita et al.

It is certified that error appears in the above-identified patent and that said Letters Patent is hereby corrected as shown below:

Page 2, item (56), under "Other Publications", in Column 2, Line 1, delete "Tthe" and insert
-- The --.

Page 2, item (56), under "Other Publications", in Column 2, Line 5, delete "Apr. 4," and insert
-- Apr. 14, --.

Column 14, Line 9, in Claim 13, delete "display" and insert -- display, --.

Signed and Sealed this
Fourteenth Day of June, 2011

David J. Kappos
*Director of the United States Patent and Trademark Office*